(12) United States Patent
Masterman et al.

(10) Patent No.: US 9,176,645 B1
(45) Date of Patent: Nov. 3, 2015

(54) MANIPULATING COLLECTIONS OF ITEMS IN A USER INTERFACE

(75) Inventors: Michael F. Masterman, Issaquah, WA (US); Sunil Singh Parihar, Renton, WA (US); Delfino J. Cornali, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 483 days.

(21) Appl. No.: 13/172,028

(22) Filed: Jun. 29, 2011

(51) Int. Cl.
*G06F 3/048* (2013.01)
*G06F 3/0482* (2013.01)

(52) U.S. Cl.
CPC .................. *G06F 3/0482* (2013.01)

(58) Field of Classification Search
CPC .................................................. G06F 3/0482
USPC .......................................... 715/845; 707/737
See application file for complete search history.

(56) References Cited

U.S. PATENT DOCUMENTS

| | | | |
|---|---|---|---|
| 5,276,797 A * | 1/1994 | Bateman et al. | 715/823 |
| 6,959,423 B2 * | 10/2005 | Bosma et al. | 715/845 |
| 7,047,033 B2 * | 5/2006 | Wyler | 455/552.1 |
| 7,558,824 B2 * | 7/2009 | Silver et al. | 709/206 |
| 7,769,794 B2 * | 8/2010 | Moore et al. | 707/831 |
| 8,090,708 B1 * | 1/2012 | Held et al. | 707/711 |
| 8,326,835 B1 * | 12/2012 | Munter | 707/737 |
| 2002/0120604 A1 * | 8/2002 | Labarge et al. | 707/1 |
| 2003/0193525 A1 * | 10/2003 | Nygaard, Jr. | 345/810 |
| 2006/0235817 A1 * | 10/2006 | Wong et al. | 707/1 |
| 2007/0026371 A1 * | 2/2007 | Wood | 434/317 |
| 2007/0150368 A1 * | 6/2007 | Arora et al. | 705/26 |
| 2008/0235205 A1 * | 9/2008 | Fein et al. | 707/5 |
| 2008/0235608 A1 * | 9/2008 | Prabhu | 715/765 |
| 2009/0083232 A1 * | 3/2009 | Ives et al. | 707/3 |
| 2010/0097380 A1 * | 4/2010 | Daniels et al. | 345/440.2 |
| 2011/0113381 A1 * | 5/2011 | Schwartz | 715/845 |
| 2011/0218946 A1 * | 9/2011 | Stern et al. | 706/12 |

OTHER PUBLICATIONS

Googlepedia: The Ultimate Google Resource, Third Edition by Michael Miller (Que Oct. 29, 2008) pp. 150, 194, 202, and 474.*
Select All & Clear All vs. Invert available at http://ux.stackexchange.com/questions/1354/select-all-clear-all-vs-invert as of Sep. 8, 2010 (Stack Exchange).*

* cited by examiner

*Primary Examiner* — William Bashore
*Assistant Examiner* — Nathan Shrewsbury
(74) *Attorney, Agent, or Firm* — Thomas | Horstemeyer, LLP

(57) ABSTRACT

Disclosed are various embodiments for handling large collections of items in a user interface. A collection of items in a data store associated with a request for a content page is identified. A content page is generated that includes a number of items in the content page, where the number of items in the content page can be less than a total number of items in the collection. The content page also includes a select-all element. The content page is also configured to initiate a subsequent request to with an argument corresponding to activation of the select-all element as well as potentially an exclusion list corresponding to deselected items.

22 Claims, 7 Drawing Sheets

Storage.site

Items 11-20 of 100

☐ Select all 100 items    ☐ Select all items on this page 4 items selected

☑ Schedule2011.doc

☐ CheeseySong.mp3

☐ CheeseyCheeseSong.mp3

☐ Cheese Recipes.doc

☑ How to make Cheese.pdf

☑ Classes.doc

☐ Term Paper.doc

☐ Music (folder)

☐ Home video.mp4

☑ Bike assembly instructions.pdf

Previous  Next

[ Copy ]  [ Move ]  [ Delete ]

FIG. 2

MANIPULATING COLLECTIONS OF ITEMS IN A USER INTERFACE

BACKGROUND

Users interacting with a content server can initiate content requests that can result in a large number of paginated results. For example, a search conducted against a database for data to be rendered in a content page can return numerous results that are presented in a paginated user interface. Additionally, a user may perform one or more operations against one or more items in such a set of results.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 2-4 are drawings of example user interfaces rendered by a client in the networked environment of FIG. 1 according to various embodiments of the present disclosure.

DETAILED DESCRIPTION

Embodiments of this disclosure are directed to systems and methods for handling collections of items that are presented in a paginated user interface to a user. When interacting with potentially large, paginated collections of items or data sets, the user may wish to select more than one item in the paginated data set and perform a bulk operation to the selected items. In some cases, a user may select all items associated with a paginated collection of items and submit a request facilitated by a user interface presented in a content page generated by a content delivery system that performs a bulk operation on the items or other items that may be stored elsewhere. Additionally, some user interfaces allow the preservation of state as a user navigates across various pages of a paginated set. In other words, whether the items in a collection of items that are selected and/or deselected by the user can be preserved as the user pages through the paginated set. Accordingly, submitting a bulk operation that includes a potentially large number of selected and/or deselected items can result in a request submitted by the user to a content server that contains a potentially large set of identifiers that corresponds to the selected items.

Therefore, embodiments of the disclosure can optimize such a process by reducing the amount of data that is transmitted from a client, particularly when a large number of items in a collection in a paginated data set are presented to a user and where the user selects multiple items in the collection to submit some type of data to a server with a request to perform an operation on the selected items. In the following discussion, a general description of an environment in which an embodiment of the disclosure can be implemented is provided, followed by a discussion of the operation of the same.

Figure 1:
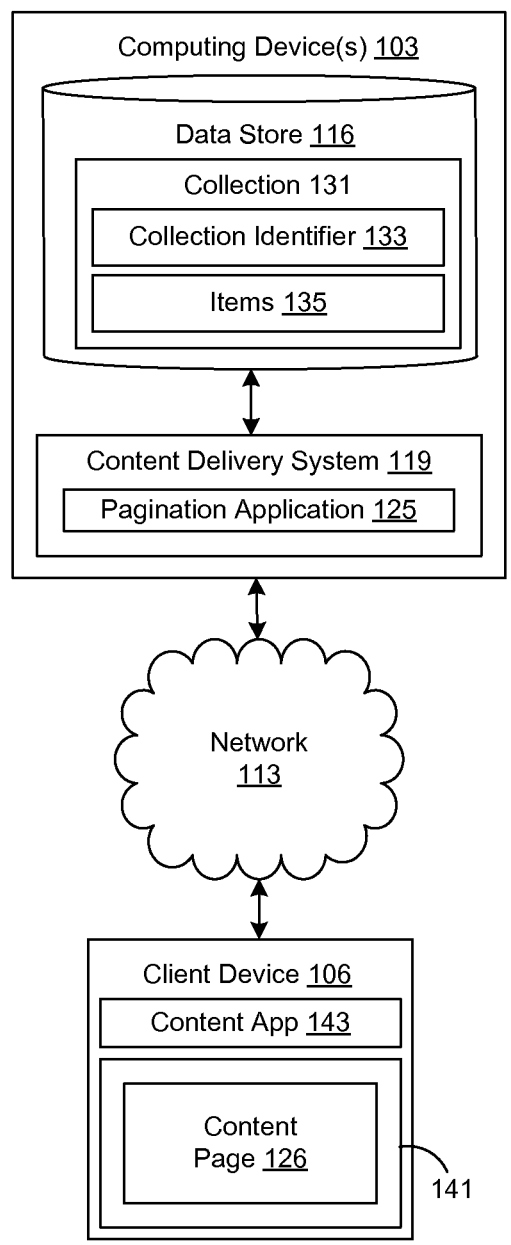
FIG. 1 is a drawing of a networked environment according to various embodiments of the present disclosure.

Accordingly, with reference to FIG. 1, shown is a networked environment 100 according to various embodiments. The networked environment 100 includes one or more computing devices 103 and one or more client devices 106 coupled to a network 113. The network 113 includes, for example, the Internet, intranets, extranets, wide area networks (WANs), local area networks (LANs), wired networks, wireless networks, or other suitable networks, etc., or any combination of two or more such networks.

The computing device(s) 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 116 that is accessible to the computing device 103. The data store 116 may be representative of a plurality of data stores as can be appreciated. The data stored in the data store 116, for example, is associated with the operation of the various applications and/or functional entities described below. In one embodiment, the data store 116 can be implemented in one computing device 103, and the other elements depicted can be implemented in other computing devices 103 as can be appreciated. In some embodiments, the data store 116 can represent a cloud storage system.

The content delivery system 119 is one example of an application that is executed on a computing device 103 in order to provide access to content that is served over the network 113. To this end, the content delivery system 119 acts as a gateway through which requests are received and responses transmitted to the clients 106. Additionally, users, via a user interface in a content page facilitated by the content delivery system 119, can submit requests that include data entered via forms or other elements in the user interface that include data submitted to the content delivery system 119. It is understood that other applications and components, such as an application implementing the hypertext transport protocol, may be executed on the computing device 103 beyond those described herein.

The computing device 103 may, in some embodiments, provide many different applications that are involved, for example, in providing services offered by an online merchant, a search engine, or other services that involve delivering content over a network 113. For example, the computing device 103 may facilitate an inventory management application or service through which users can view and/or manage data regarding potentially large inventories in a warehouse and/or fulfillment center. As another example, the computing device 103 can facilitate an electronic mail application in which users can access and manage electronic mail via a browser application, mail client, or other type of application. The computing device 103 may also facilitate a search engine and/or search indexer, etc., that facilitates the functionality of a search engine. In these and other types of systems, users may initiate content requests that result in potentially large collections of items that in some cases can be presented in paginated form in a user interface rendered on a client 106. However, it should be appreciated that collections of items served to a client 106 may not always be presented in a paginated form.

In one embodiment, the content delivery system 119 can facilitate the generating of dynamic content pages such as, for example, dynamic web pages that are provided to clients 106 in response to various requests. These content pages can be generated by the content delivery system 119 and include client side code that is executed by a client device 106. Such client side code can facilitate rendering of a user interface in a client 106 as well as allow a user to interact with the user interface to provide inputs and other interactions with the user interface.

As will be described in further detail below, the pagination application 125 can facilitate the handling of potentially large collections of items that are also potentially presented in a paginated user interface on a client. The pagination application 125 can generate user interface elements that as well as client side code embedded in a content page rendered on a client 106 that reduce to computing and bandwidth requirements necessary for submission of bulk operations to various items in a collection.

The data store 116 can include information about various collections of items that are related to data accessible via a client 106. A collection 131 can represent any assemblage of data items 135 that can be presented in list or some other form to a user in a user interface. A collection 131 can represent data regarding inventory in a warehouse, emails in an email system, products in an electronic commerce system, or any other data. A collection 131 can also be associated with a collection identifier 133 with which it can be referenced. Additionally, the pagination application 125 may perform a query against data in the data store 116 to generate a collection on the fly, which can then be presented to a user in a user interface. For example, the pagination application 125 and/or content delivery system 119 can perform a query against a relational database to retrieve data that is requested by a client 106, generate a content page containing at least a subset of this data, and transmit the content page to the client 106. Therefore, although in the depicted embodiment collections 131 are shown are persisted in the data store 116, it should be appreciated that in some embodiments they can be dynamically generated instead.

The client device 106 is representative of a plurality of client devices 106 that may be coupled to the network 113. The client device 106 may comprise, for example, a processor-based system, such as a computer system. Such a computer system may be embodied in the form of a desktop computer, a laptop computer, a personal digital assistant, a mobile device (e.g. cellular telephone, smart phone, etc.), tablet computing system, set-top box, music players, or other devices with like capability. The client device 106 can also include a display device 141 upon which various content pages 126 and other user interfaces may be rendered. The client device 106 can also include one or more input devices with which a user can interact with a user interface rendered on the display device 141. For example, the client device 106 can include or be in communication with a mouse, touch input device (e.g., capacitive and/or resistive touchscreen), keyboard, or other input devices.

The client device 106 may be configured to execute various applications, such as a content application 143 and/or other applications. The content application 143 may be executed in a client device 106, for example, to access and render content pages 126, such as web pages, or other network content served up by the computing device 103 and/or other servers. In one embodiment, the content application 143 can comprise a browser application. The client device 106 may be configured to execute a special purpose application with which a user can interact with a user interface generated by the pagination application 125 and/or on the device itself. In some embodiments, certain functionality that is described in relation to the content delivery system 119 and/or pagination application 125 can be partially or wholly executed in the client device 106. In other words, a user interface can be generated and/or customized by the pagination application 125 without interactions over a network 113 with the computing device 103.

A content page 126 may be, for example, a dynamic network page such as a dynamic web page or other type of content. For example, while navigating through the various content pages 126 made available through the content delivery system, the content application 143 may send a request for a specific content page 126 to the content delivery system 119. The content delivery system 119 interfaces with the appropriate application(s) executed on the computing device 103 such as the pagination application 125, as well as the data store 116 or any other resource containing data necessary to generate the desired content page 126 that is then transmitted to the content application 143. In one embodiment, the content delivery system 119 can obtain a page template corresponding to a requested content page 126 and populate the template with at least a subset of a total number of items in a collection 131 associated with a particular content request received from the client 106.

Additionally, the content application 143 can also be configured to execute client side code that is embedded in a content page 126 generated by the content delivery system 119 and/or pagination application 125. Such client side code can be configured to facilitate asynchronous updating of a user interface provided by the computing device 103, input and/or submission of data via forms or other user interface elements, or other logical operations as can be appreciated. Client side code can be implemented in any number of programming, presentation, and/or scripting languages, which can include, but are not limited to JavaScript, VBScript, cascading style sheets, hypertext markup language (HTML), and other languages and methods.

Next, a general description that provides examples of the various ways in which the pagination application 125 can facilitate the handling of collections of items that are provided in a user interface. The pagination application 125 can generate a content page 126 that includes specialized client side code that can make requests to perform one or more operations on multiple items in such a collection from a client 106 more efficient. In one embodiment, the pagination application 125 can receive a content request for a content page 126 or any other user interface element that includes a list of items from a collection 131. In some scenarios, the collection 131 requested by a client 106 may be too large to include in a single content page 126 provided to the client 106. Accordingly, the content page 126 transmitted to the client 106 as a result of a content request can include a number of items from the collection 131 that is less than the total number of items in the collection.

For example, suppose a content request received from a client 106 is for a subset of items in a collection 131 of items that numbers thousands of items. The pagination application 125 can generate a content page 126 that includes a subset of the collection 131, such as fifty or a hundred items that can be rendered in a single page on the client 106. As one example, suppose a content request is related to a request for an email inbox of a user, where the email inbox includes thousands of emails. In this example, the pagination application 125 can generate a content page 126 that can be rendered in a browser that includes the most recent fifty emails in the inbox.

The content page 126 generated by the pagination application 125 can include various user interface elements that allow a user to select one or more items shown in the content page 126. These user interface elements can include a selection element corresponding to each email in the content page 126 as well as various buttons, text input boxes and other user interface elements. Additionally, the content page 126 generated by the pagination application 125 can also include a select-all element that allows the user to select all items in a collection 131 to which the items placed in the content page 126 correspond. In this way, the pagination application 125 can allow the user to select all elements in a collection 131 without sending data about each item in the collection to the client or embedding such data in the content page. Accordingly, if a user enables such a select-all element and submits a request via the content page to perform an operation on all items in the collection 131, the pagination application 125 and/or any other system to which the request is submitted can perform the requested operation on all items in the collection 131 rather than only the number items displayed in the content page 126.

As one example, in the above-mentioned scenario of a content page displaying a subset of a collection of emails in an email inbox, if the user selects such a specialized select-all element and submits a request to the content delivery system 119 to delete all of the emails in the collection, such an operation can be performed on all emails in the email inbox corresponding for which a subset is displayed in the content page. To this end, the pagination application 125 can embed client side code that includes a collection identifier 133 corresponding to the collection 131. Therefore, if the select-all element in the content page generated by the pagination application 125 and submits a requests to perform an operation on the items in the collection 131, the content page can include logic that transmits an argument that alerts the recipient of the request (e.g., the content delivery system 119) that the select-all element has been activated as well as the collection identifier 133 that allow the recipient to identify the appropriate collection 131 on which to perform the operation. In this way, the content page generated by the pagination application 125 can allow the user to perform a bulk operation on all items in the collection 131 without individualized data, such as an item identifier, for each item in the collection 131 being embedded in the content page.

The pagination application 125 can also allow an operation less than all items in a collection 131 that can also utilize efficiencies realized by embodiments of the disclosure. Continuing the above-example, the pagination application 125 can generate a content page that includes client side code that detects when the select-all element is activated by the user. If the user, after activating the select-all element, subsequently deselects a selection element associated with one or more items in the content page, the content page can build an exclusion list that includes an item identifier corresponding to the deselected items.

In one example, as noted above, the pagination application 125 can embed a collection identifier 133 corresponding to the collection 131 with which the items in the content page are associated. Additionally, each item displayed in the content page generated by the pagination application 125 can be associated with an item identifier that is also embedded in the content page. The item identifier can uniquely identify an item displayed in a content page within the collection 131 with which it is associated.

Therefore, the content page can include logic that builds an exclusion list as described above that includes an item identifier corresponding to the items that are deselected by the user's interactions with the content page in the client 106. Subsequently, if a user submits a request to perform an operation on the items selected in the content page, the request can include an argument alerting the recipient of the request that the select-all element is activated as well as the exclusion list that identifies the deselected items. In this way, the user can, via a content page generated by the pagination application 125, initiate a request to perform an operation on more items in a collection 131 than are displayed in a content page without an identifier or other data corresponding to each of these items being embedded in the content page.

In some embodiments, the item identifier can uniquely identify an item only with respect to the other items that are displayed in the content page. In this scenario, the pagination application 125 can take into account the ordering of the items from the collection that are displayed in the content page as well as a page number that the user is viewing in an ordered list of items. Therefore, a request to perform an operation on items from a collection 131 as described above can also include an argument that describes the ordering as well as a page number associated with the list of items. Accordingly, the pagination application 125, content delivery system 119 or other recipient of a request to perform an operation on items that are selected in the user interface can derive the deselected items based upon the ordering of the items in the collection as displayed in the content page, the page number that the user is viewing as well as a collection identifier 133 and an exclusion list submitted with such a request by the content page.

In other words, the recipient of the request can recreate the collection 131 as well as the selected and deselected items from the collection 131 with the various data submitted with the request. In this way, as noted above, a user can initiate a request to perform an operation on more items from a collection 131 than are displayed in a content page without an item identifier or other information about all of the items in the collection 131 being embedded in the content page. In some embodiments, the content page 126 can be configured with logic that submits, as an exclusion list, an argument corresponding to a page number in a paginated set rather than item identifiers corresponding to each of the items in a page. In this scenario, a user can specify that a requested operation be performed on all items in a collection except for those in a particular page number that corresponds to a subset of the collection as rendered in the content page. Accordingly, the recipient of the request can recreate the collection 131 and determined the items that were displayed on a page number corresponding to such a page numbering argument. Subsequently, the recipient can perform the requested operation on all items in the collection 131 except for the subset of the collection 131 corresponding to the page numbering argument.

Reference is now made to FIG. 2, which illustrates an example user interface associated with a content page 126 generated by the pagination application 125 according to various embodiments of the disclosure. The depicted content page 126 can include logic generated by and embedded within the content page 126 the pagination application 125. In the depicted example, a subset of items in a collection 131 is shown in a user interface. Many user interfaces can be associated with a collection 131 of items that is too large to display in a single content page 126 for various reasons, including performance, bandwidth, aesthetic design considerations, and other factors as can be appreciated.

Accordingly, the depicted content page 126 includes a select-all element 201 according to embodiments of the disclosure. In the depicted example, the content page 126 can also include a selection status element 203 can display a number of correctly selected items by the user. Each of the items from the collection 131 that are displayed in the content page 126 can also be associated with selection element 205 as well as an item identifier embedded in the content page 126 that uniquely identifies each item within the collection 131 or uniquely identifies the item relative to the other items currently displayed in the content page 126. The example content page 126 of FIG. 2 also includes various user interface elements that allow a user to initiate a request to perform an operation on one or more selected items displayed in the content page.

Figure 3:
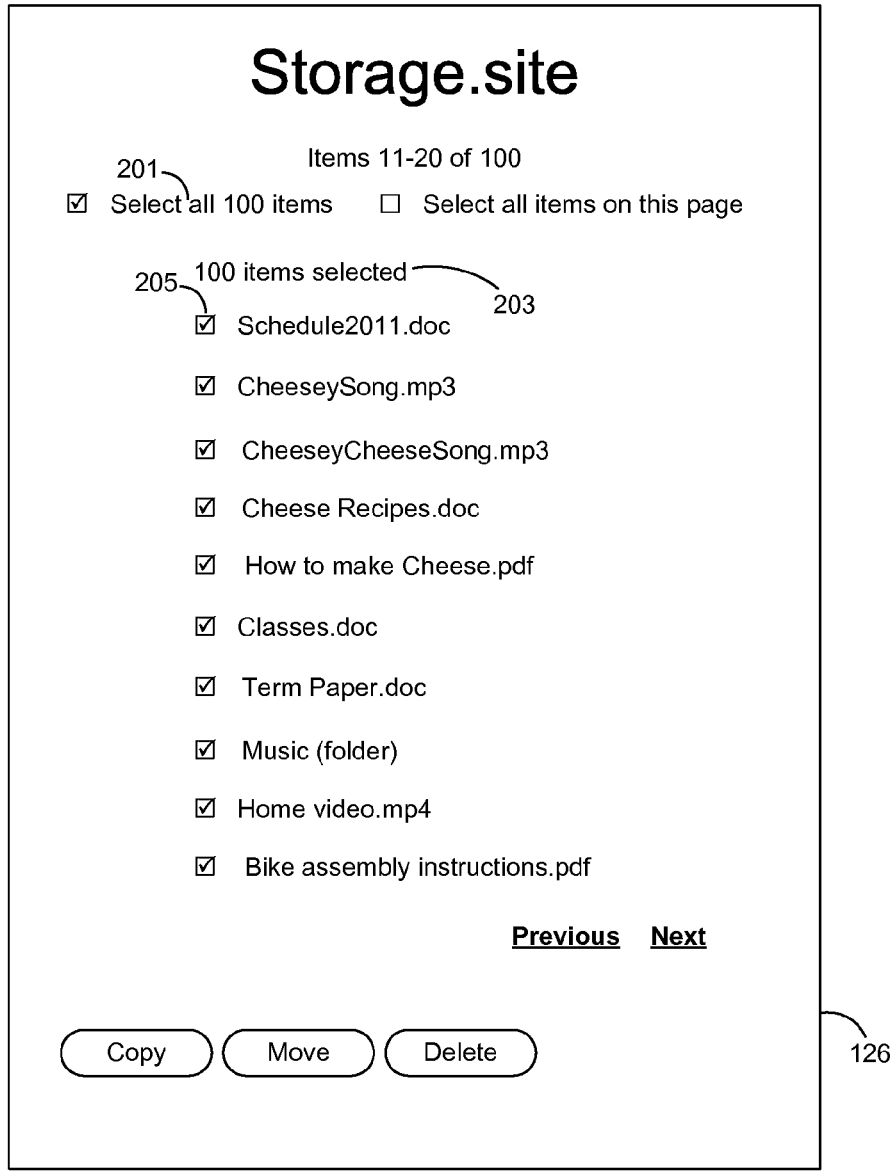

Continuing the example of FIG. 2, reference is now made to FIG. 3 which illustrates the content page 126 when the select-all element 201 is selected or activated. The depicted select-all element 201 allows a user to select all items in a collection 131 as opposed to only the items shown in the content page 126. The pagination application 125 can embed a total number of items in the collection 131 in the content page 126 so that the selection status element 203 can provide a visual cue to the user that he or she has selected all of the items in the collection 131 as opposed to only the items shown in the content page 126. Accordingly, if a user selects the select-all element 201 and submits a request to a recipient such as the pagination application 125, content delivery system 119 or any other system to perform an operation on the collection 131, the content page 126 can include an argument that alerts the recipient system that the select-all element is activated, which can inform the recipient system that the operation should be performed on the entire collection 131.

Figure 4:
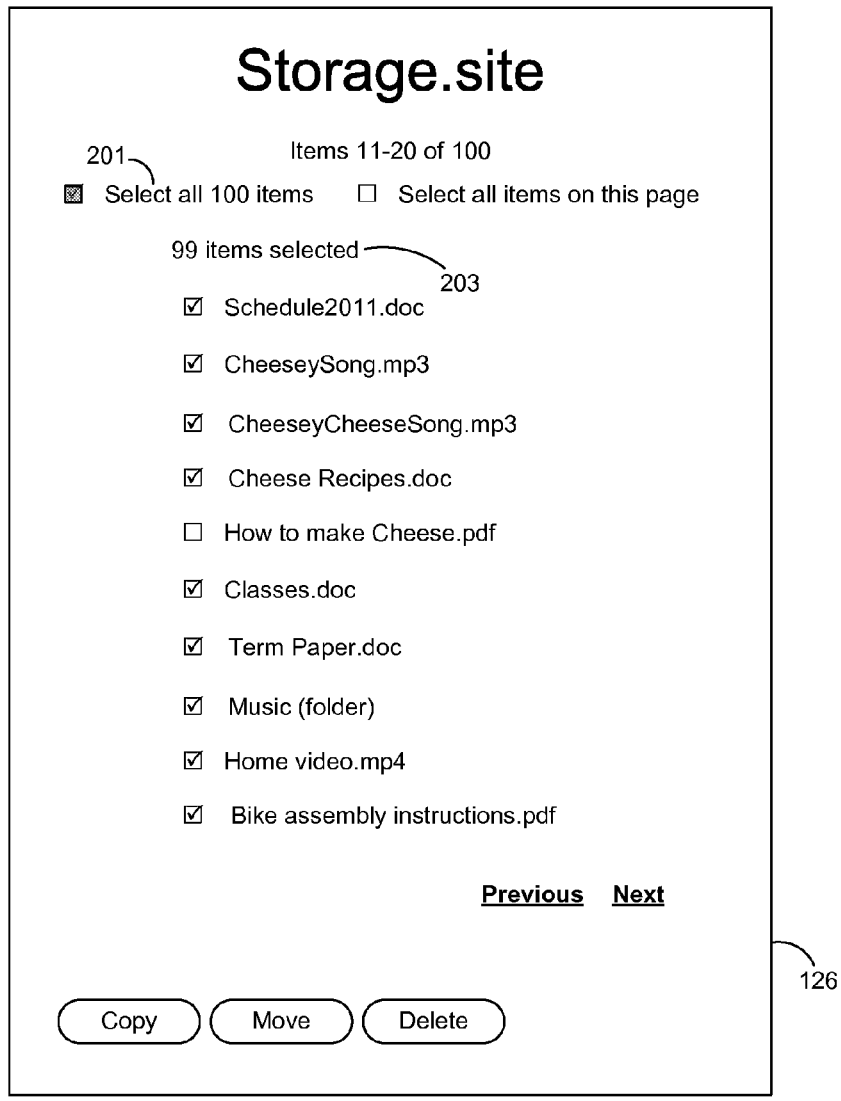

Continuing the example of FIG. 3, reference is now made to FIG. 4, which illustrates the content page 126 when the user has selected the select-all element 201 and subsequently deselected certain items from the collection 131 that are displayed in the content page 126. In this scenario, the pagination application 125 can build an exclusion list as the user deselects items that includes an item identifier associated with the deselected item. The content page 126 can also be embedded with logic that changes a state associated with the select-all element 201 if a user has activated the select-all element 201 and subsequently deselects items shown in the page. In such an example, the select-all element 201 can be changed to a neutral state, an inactive state, or any state that can provide a visual cue that varies from an active or selected state. In this way, the content page 126 can provide a visual cue that alerts the user that the select-all element 201 is activated but that items in the page are also deselected.

If a user submits a request to perform an operation on the selected items from the collection, the content page 126 can include in the request an argument alerting the recipient of the request that the select-all element is active as well as an exclusion list that identifies deselected items from the collection 131 by an item identifier. Accordingly, the recipient system can perform the requested operation on all items from the collection 131 that are not in the exclusion list. To illustrate an example of efficiency gained from such a methodology, the example shown in FIGS. 2-4 shows a collection that includes one hundred items. Therefore, if the user initiates a request to perform an operation on the collection as shown in FIG. 4, the content page can transmit a collection identifier that is embedded in the content page, an argument that the select-all element 201 has been activated, and an exclusion list with the one deselected item. This would be in contrast to a prior art system where potentially a list of ninety-nine item identifiers would be submitted to the recipient system.

Figure 5:
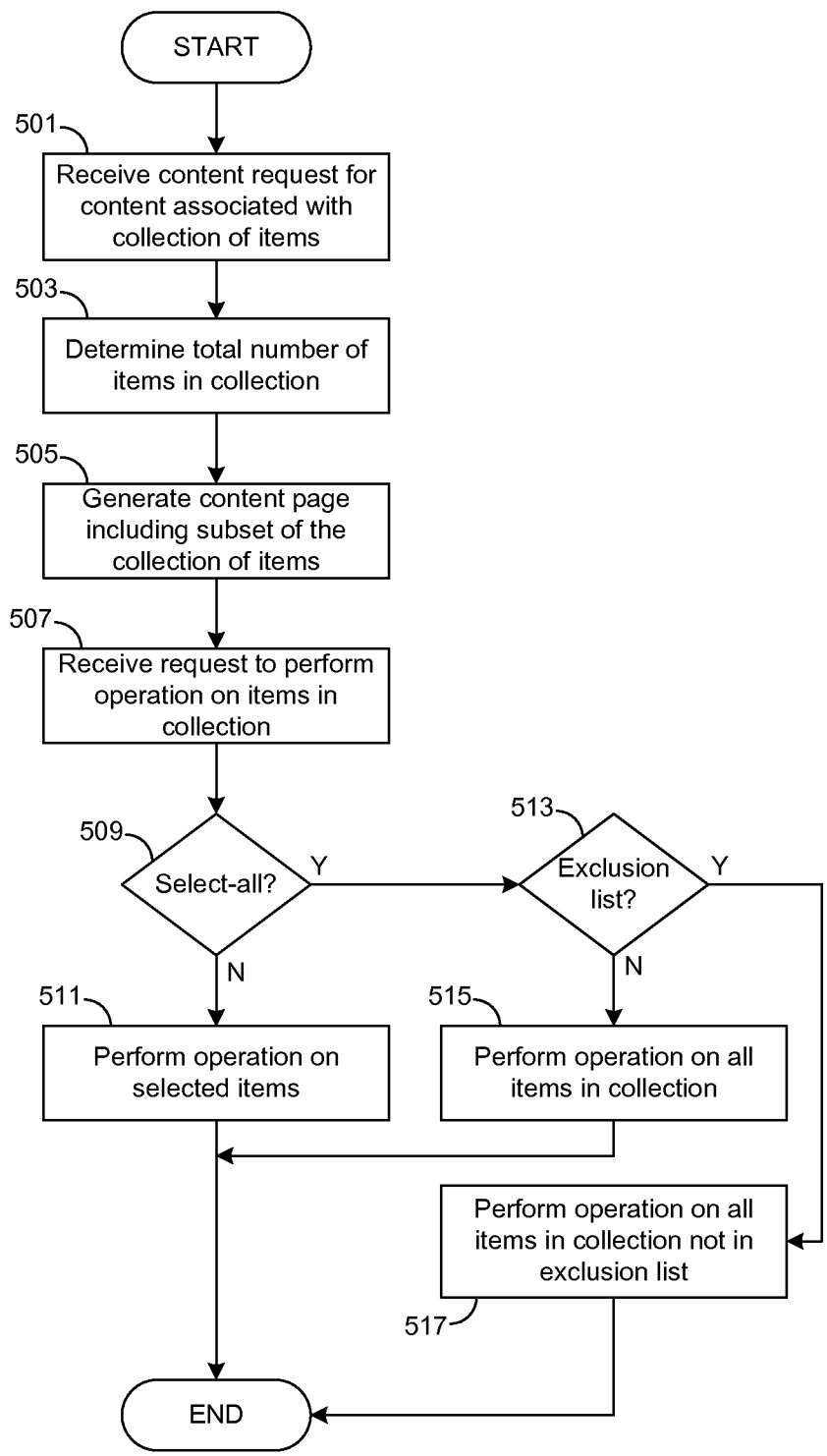
FIGS. 5-6 are flowcharts illustrating examples of functionality implemented as portions of pagination application executed in a computing device in the networked environment of FIG. 1 as well as a content page generated by the pagination application according to various embodiments of the present disclosure.

Referring next to FIG. 5, shown is a flowchart that provides one example of the operation of a portion of the pagination application 125 according to various embodiments. It is understood that the flowchart of FIG. 5 provides merely an example of the many different types of functional arrangements that may be employed to implement the operation of the portion of the pagination application 125 as described herein. As an alternative, the flowchart of FIG. 5 may be viewed as depicting an example of steps of a method implemented in the computing device 103 (FIG. 1) according to one or more embodiments.

Beginning with box 501, the pagination application 125 can receive a content request associated with a collection 131 of items. In box 503, the pagination application 125 can determine a total number of items, and in box 505 it can generate a content page 126 associated with the collection. In the case of a paginated set of data related to the collection, a given content page can include a number of items from the collection that is less than the total number of items. The number of items included in a content page 126 can vary depending on various user interface style constraints, requirements and other considerations as can be appreciated. As noted above, a collection identifier 133 as well as the total number of items in the collection 131 can be embedded in the content page 126, as can item identifiers corresponding to the items that are embedded in the page.

In box 507, the pagination application 125 can receive a request to perform an operation on items in the collection 131 from the content page 126. In box 509, the pagination application 125 can determine if a select-all element was active when the submission was initiated by determining whether an argument corresponding to the select-all element is in the request. In box 511, if the select-all element was not active, the pagination application 125 can perform the requested operation on the selected items in the content page 126. In box 513, if the select-all element was active when the request was initiated, the pagination application 125 can determine if there is also an exclusion list included in the request. If not, then in box 515 the pagination application 125 can perform the requested operation on all items in the collection 131 identified by a collection identifier 133 in the request. If there is an exclusion list associated with the request, then in box 517, the pagination application 125 can perform the requested operation on all items in the collection 131 that are not identified by the exclusion list.

Figure 6:
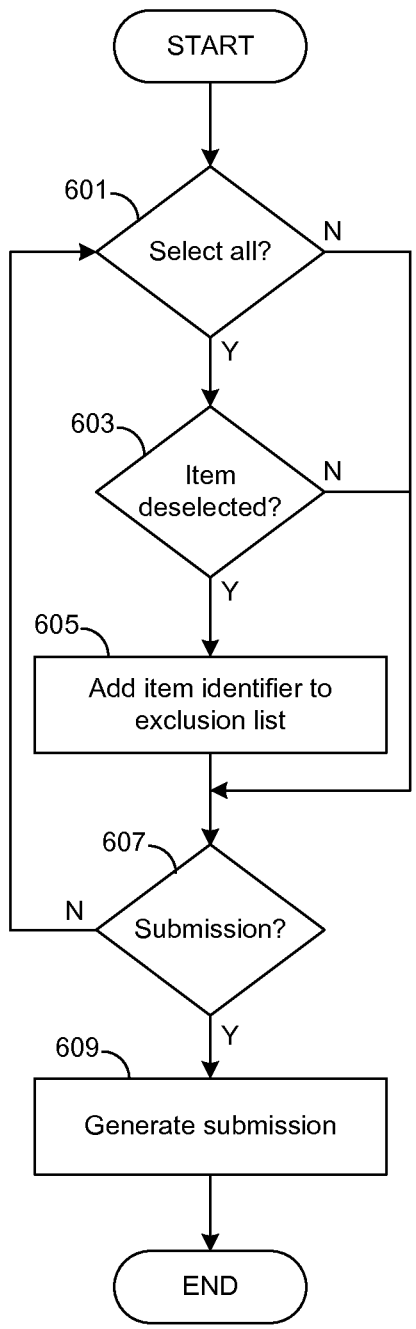

Reference is now made to FIG. 6, which illustrates one example of logic that can be embedded in a content page 126 by the pagination application 125. The embedded logic that builds an exclusion list that can in turn be associated with a request to perform an operation on a collection 131. In box 601, the content page 126 can determine whether a select-all element is selected. If not, then the content page 126 will not generate an exclusion list. If the select-all element is activated, then in box 603, the content page 126 can identify whether an item is deselected. If so, then in box 605 the item is added to the exclusion list. It should be appreciated that one or more items can be selected as a user navigates a content page 126 and/or a paginated set of content pages 126 associated with the collection 131. In box 607, the content page 126 can determine if the user has initiated submission of one or more selected items on which an operation is to be performed. If the user has initiated submission, then in box 609, the content page 126 can generate such a submission, which can include an argument corresponding to a page number in a paginated collection, an ordering of the collection, and/or whether the select-all element is selected. Additionally, the submission can include the exclusion list generated by the content page 126. Accordingly, as noted above, if the submission includes an exclusion list as well as an argument that corresponds to selection of the select-all element, the recipient can perform a requested operation on all items in the corresponding collection that are not in the exclusion list.

Figure 7:
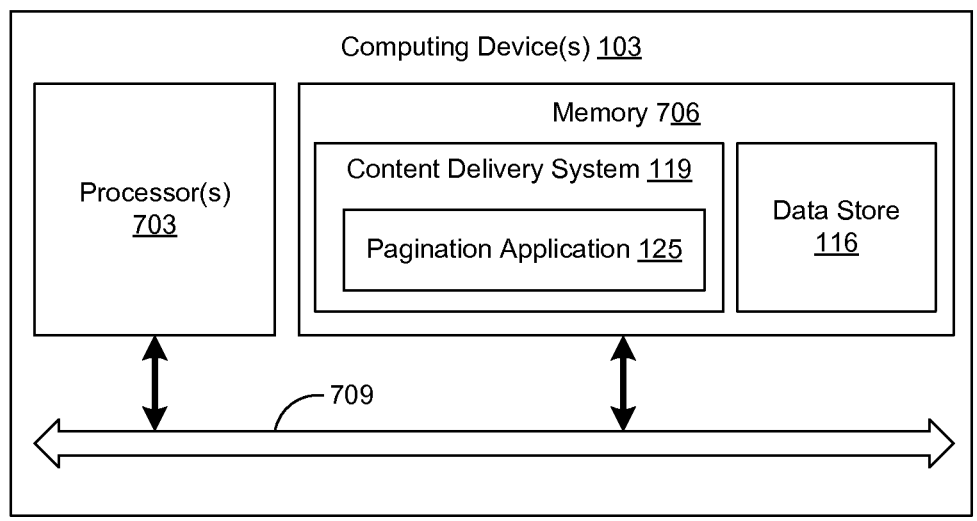
FIG. 7 is a schematic block diagram that provides one example illustration of a computing device employed in the networked environment of FIG. 1 according to various embodiments of the present disclosure.

With reference to FIG. 7, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the pagination application 125, and potentially other applications. Also stored in the memory 606 may be a data store 116 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 113 that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the pagination application 125 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 5-6 show the functionality and operation of an implementation of portions of the pagination application 125 and/or a content page 126 generated by the pagination application 125. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 5-6 show a specific order of execution, it is understood that the order of execution may differ from that which is depicted. For example, the order of execution of two or more blocks may be scrambled relative to the order shown. Also, two or more blocks shown in succession in FIGS. 5-6 may be executed concurrently or with partial concurrence. Further, in some embodiments, one or more of the blocks shown in FIGS. 5-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the pagination application 125, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, wherein, when executed, the program causes the computing device to at least:
   receive a request for content from a client device, the request being associated with a plurality of items;
   determine a total number of the plurality of items associated with the request;
   generate a content page comprising a number of the plurality of items represented in the content page, wherein the number of the plurality of items represented in the content page is less than the total number of the plurality of items, wherein the content page further comprises a select-all element and a content submission user interface element, wherein the content page further comprises:
      a plurality of instructions that, when executed, cause the client device to at least determine whether the select-all element is activated,
      determine, in response to the select-all element being activated, whether at least one selection element associated with at least one of the plurality of items is deselected,
      associate, in response to the at least one selection element being deselected, the at least one of the plurality of items associated with the at least one selection element with an exclusion list, and transmit the exclusion list in conjunction with an operation request to the computing device;
   transmit the content page to the client device; and
   perform an operation associated with the operation request on at least one of the plurality items that is not in the exclusion list.

2. A system, comprising:
   a data store that stores item data; and
   at least one computing device in communication with the data store, the at least one computing device configured to at least:
      receive a request for content from a client device, the request being associated with a plurality of items;
      determine a total number of the plurality of items associated with the request;
      generate a content page representing at least a subset of the plurality of items; and
      transmit the content page to the client device;
      wherein the content page further comprises a select-all element, a content submission user interface element, and an item selection element corresponding to each of the at least a subset of the plurality of items, and the content page, when rendered by the client device, is configured to at least:
         build an exclusion list including at least one deselected item in the content page in response to a user selection of the select-all element;
         in response to deselection of the item selection element corresponding to a respective one of the at least a subset of the plurality of items, associating the respective one of the at least a subset of the plurality of items with the exclusion list; and
         transmit an operation request and the exclusion list to the at least one computing device to perform an operation on at least one item from the at least a subset of the plurality of items that is not in the exclusion list.

3. The system of claim 2, wherein a number of the at least a subset of the plurality of items in the content page is less than the total number of the plurality of items.

4. The system of claim 2, wherein the content page further comprises an identifier uniquely identifying the plurality of items associated with the request.

5. The system of claim 4, wherein the item selection element associated with each of the plurality of items in the content page facilitates a user selection or deselection of an item.

6. The system of claim 4, wherein the content page, when rendered by the client device, is further configured to at least submit the identifier uniquely identifying the plurality of items to the at least one computing device.

7. The system of claim 6,
   wherein the operation request further comprises an argument identifying that the select-all element is selected.

8. The system of claim 7, wherein the at least one computing device is further configured to at least:

determine, from the operation request submitted by the client device under control of the content page, an identity of the respective one of the at least a subset of the plurality of items; and perform the operation on the at least one item that is not in the exclusion list.

9. The system of claim 7, wherein the at least one computing device is further configured to at least:

identify an ordering of the at least a subset of the plurality of items as rendered in the content page, wherein the respective item identifier is based at least upon the ordering; and identify the respective one of the at least a subset of the plurality of items based at least upon the respective item identifier of the respective one of the at least a subset of the plurality of items in the exclusion list.

10. The system of claim 2, wherein the request for the content further comprises a page selection argument corresponding to a page number, and wherein the at least one computing device is further configured to at least identify which of the plurality of items are displayed in the content page based at least upon the page selection argument.

11. The system of claim 2, wherein the request for the content further comprises an ordering argument corresponding to an ordering of the at least a subset of the plurality of items in the content page, and wherein the at least one computing device is further configured to at least identify which of the plurality of items are in the exclusion list based at least upon the ordering argument.

12. The system of claim 6, wherein the at least one computing device is further configured to at least embed an indicator of a total quantity of the at least a subset of the plurality items in the content page, and wherein the content page, when rendered by the client device, is further configured to at least:

determine a first quantity of deselected items in the content page;

calculate a second quantity of selected items by subtracting the first quantity from the total quantity of the at least a subset of the plurality of items; and render the second quantity of selected items in the content page.

13. A computer-implemented method, comprising:

identifying, in at least one computing device, a plurality of items in a data store associated with a request for a content page from a client device;

generating, in the at least one computing device, the content page representing a number of the plurality of items, the number of the plurality of items represented in the content page being a subset of the plurality of items, the content page comprising a select-all element and an item selection element corresponding to each of the subset of the plurality of items;

transmitting, from the at least one computing device, the content page to the client device; and wherein the content page, when rendered by the client device, is configured to cause the client device to at least:

build an exclusion list including at least one deselected item in the content page in response to a user selection of the select-all element;

in response to deselection of the item selection element corresponding to a respective one of the subset of the plurality of items, associating the respective one of the subset of the plurality of items with the exclusion list; and submit the exclusion list in conjunction with an operation request to the at least one computing device to perform an operation on at least one item from the subset of the plurality of items that is not in the exclusion list.

14. The computer-implemented method of claim 13, wherein the content page further comprises an identifier with which the plurality of items can be identified.

15. The computer-implemented method of claim 13, wherein the content page further comprises a plurality of item selection elements, wherein each of the plurality of item selection elements allows a user to select and deselect at least one of the plurality of items.

16. The computer-implemented method of claim 14, wherein the content page, when rendered by the client device, is further configured to cause the client device to at least submit the identifier for the plurality of items to the at least one computing device.

17. The computer-implemented method of claim 14, wherein the operation request further comprises the exclusion list and an argument identifying that the select-all element is selected.

18. The computer-implemented method of claim 17, further comprising:

determining, in the at least one computing device, from the operation request submitted by the content page, an identity of the respective one of the subset of the plurality of items in the exclusion list; and performing, in the at least one computing device, the operation on each of the plurality of items that are not in the exclusion list.

19. The computer-implemented method of claim 17, wherein the operation request further comprises an additional argument corresponding to an ordering of the subset of the plurality of items in the content page, and the at least one computing device identifies the respective one of the subset of the plurality of items based at least upon the ordering.

20. The system of claim 2, wherein the operation request specifies to perform the operation on all the plurality of items that are not in the exclusion list.

21. The method of claim 13, wherein the operation request specifies to perform the operation on all the plurality of items that are not in the exclusion list.

22. The method of claim 13, wherein the operation request specifies to perform the operation on all the plurality of items in the subset of the plurality of items that are not in the exclusion list.

* * * * *